(12) United States Patent
Hirano et al.

(10) Patent No.: US 6,504,663 B2
(45) Date of Patent: Jan. 7, 2003

(54) DISK APPARATUS AND DISK MEDIUM HAVING A RAMP LOADING MECHANISM

(75) Inventors: Masakazu Hirano, Kawasaki (JP); Nobuyuki Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/731,403

(22) Filed: Dec. 6, 2000

(65) Prior Publication Data

US 2001/0048566 A1 Dec. 6, 2001

(30) Foreign Application Priority Data

Jun. 1, 2000 (JP) ........................................ 2000-164095

(51) Int. Cl.$^7$ ................................................ G11B 5/09
(52) U.S. Cl. .................... 360/48; 360/75; 360/77.08; 360/78.14; 360/135; 360/51
(58) Field of Search .................. 360/48, 75, 77.08, 360/78.14, 135, 51, 77.02, 78.04

(56) References Cited

U.S. PATENT DOCUMENTS

| 5,455,723 A | * 10/1995 | Boutaghou et al. ........... 360/75 |
| 5,633,570 A | 5/1997 | Motzko |
| 5,838,514 A | * 11/1998 | Smith et al. .................. 360/75 |
| 6,118,632 A | 9/2000 | Albrecht et al. |

FOREIGN PATENT DOCUMENTS

| EP | 0 713 218 A3 | 5/1996 |
| EP | 0 713 218 A2 | 5/1996 |

* cited by examiner

*Primary Examiner*—Alan T Faber
(74) *Attorney, Agent, or Firm*—Greer, Burns & Crain, Ltd.

(57) ABSTRACT

A disk apparatus having a ramp loading mechanism. A disk medium on which second servo patterns have been written in a landing area on the medium at a finer interval than that of first servo patterns written in a data area is used. When a head is moved from a ramp to the landing area on the medium, a lead-in processing unit performs a servo lead-in on the basis of the second servo patterns written in the landing area at a fine interval.

20 Claims, 14 Drawing Sheets

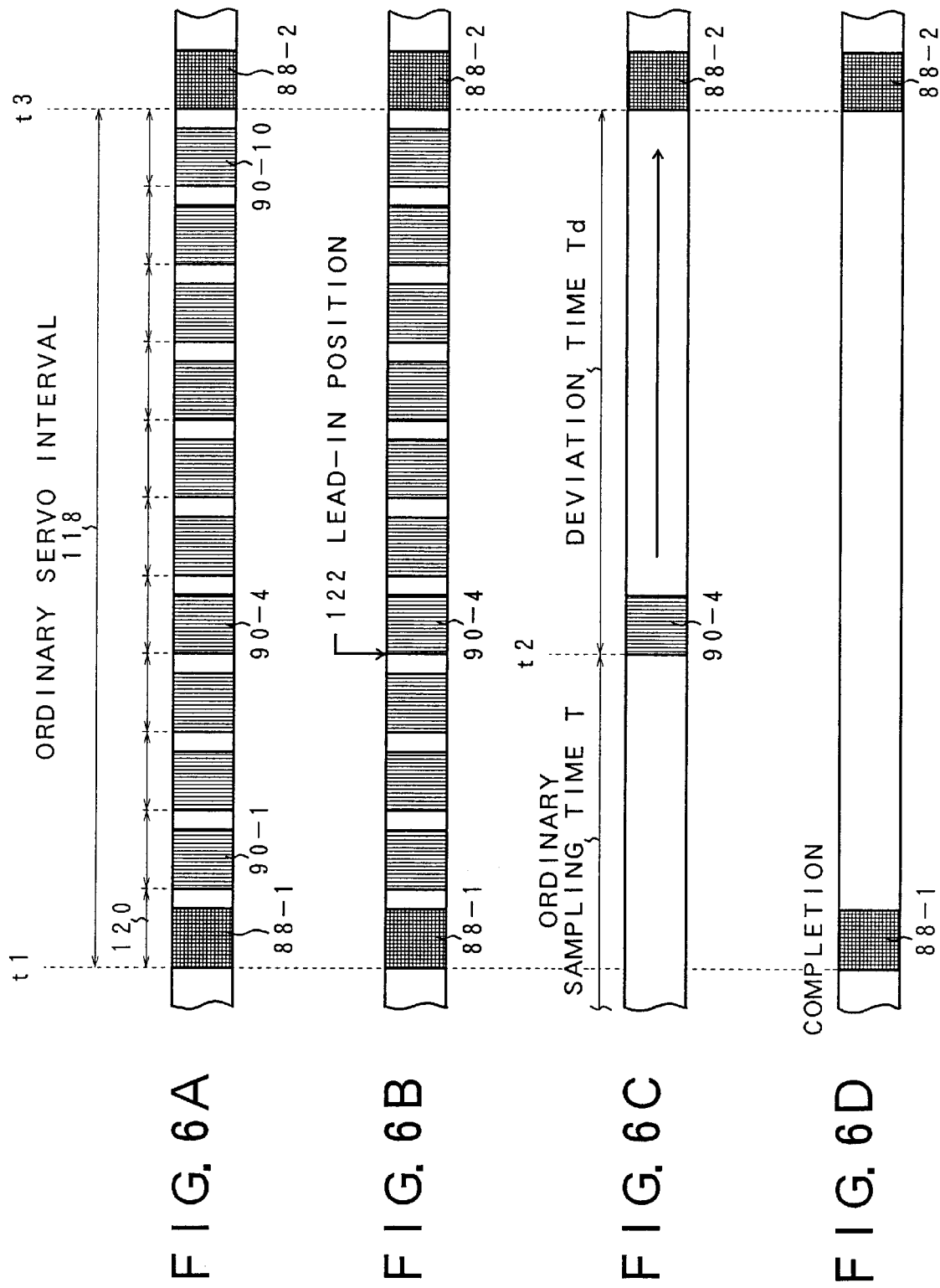

DISK APPARATUS AND DISK MEDIUM HAVING A RAMP LOADING MECHANISM

BACKGROUND OF THE INVENTION

1. Field of the Invention

The invention relates to a disk apparatus having a ramp loading mechanism and a disk medium of such an apparatus. More particularly, the invention relates to a disk apparatus for efficiently performing a servo lead-in at the time when a head is moved to a landing area on a medium and a disk medium of such an apparatus.

2. Description of the Related Arts

In recent years, in a disk apparatus of a disk such as an HDD of 2.5 inches or the like, by providing a ramp loading mechanism, a head is moved to a ramp from a host in an access waiting mode, a drive current of a voice coil motor (hereinafter, abbreviated to "VCM") is shut off, and the apparatus is set into the access waiting mode, thereby suppressing a VCM current consumption in the access waiting mode and extending a life of a battery of a notebook-sized personal computer or the like having the disk apparatus therein. In such a disk apparatus having the ramp loading mechanism as mentioned above, to avoid a head touch at the time of moving the head to a landing area of the medium by the ramp loading, a speed control is generally performed so as to obtain a landing speed which is equal to or less than $\frac{1}{10}$ of that of the ordinary seeking operation. In a range where it is considered that, when the head during the ramp loading operation is landed onto the medium, the head is come into contact with the medium, the servo lead-in and the reading and writing operations of the data are not performed but the servo lead-in is performed after the head was moved to an area where it is stably floated, a laser beam is moved to a target track so as to enter an on-track state at the completion of the servo lead-in, and the head is positioned to a target sector after that. The operation necessary at the time of servo lead-in is a gain control of an AGC amplifier provided in a read channel and an adjustment of synchronization for a read clock of a PLL. Both of them are performed by using a head preamble of servo information. Particularly, in recent years, since the servo information is also sampled by an A/D converter and processed, it is necessary to detect the servo information a plurality of number of times. The number of servo information recorded on the medium per circumference has been predetermined. It is more preferable to set the number of servo information to a small value in consideration of an efficiency of a data format.

However, in such a conventional disk apparatus having the ramp loading mechanism as mentioned above, since the servo lead-in operation is performed after the head passed through the landing area of the medium, it takes time for the servo lead-in in correspondence to it. To make adjustments of the AGC and PLL which are executed in the servo lead-in operation, it is necessary to read out a plurality of servo information discretely written in the circumferential direction, so that it becomes a factor of extending the lead-in time.

SUMMARY OF THE INVENTION

According to the invention, there are provided a disk apparatus in which a servo lead-in time upon ramp loading is reduced and access performance is improved and a disk medium.

According to the invention, there is provided a disk apparatus having a ramp loading mechanism, comprising: a disk medium in which servo information has been written in a landing area on a medium; and a lead-in control unit which performs a lead-in of a servo detecting system on the basis of the servo information when a head is moved from a ramp to the landing area on the medium. Fundamentally, on the disk medium, the second servo information is written in the landing area at an interval which is finer than that of first servo information written in a data area. Therefore, when the head is moved to the landing area on the medium by the ramp loading operation, the lead-in operation is started by using, for example, the second servo information written in the landing area at the fine interval. The lead-in of the servo detecting system can be completed in the landing area. Although it is necessary to sample a plurality of servo information for the purpose of lead-in of the servo detecting system, since the second servo information in the landing area has been written at the finer interval than that of the first servo information in the data area, the servo information of the necessary number can be sampled in a short time. A time necessary for the control of a proper value in the AGC of a variable gain control amplifier (VGC) and the adjustment of a proper value in the PLL are remarkably improved.

On the disk medium, in addition to the same first servo information as that in the data area, the second servo information is written in the landing area at the finer interval. By allowing the first servo information in the data area and the dedicated second servo information to exist mixedly in the landing area as mentioned above, it is sufficient to add the dedicated second servo information into the landing area without changing the writing of the servo information due to an existing servo writer and the servo writing can be easily performed. On the disk medium, it is desirable to write the servo information into the landing area over the whole circumference. The finer the interval of the servo information in the landing area, the time necessary for sampling only the necessary number of servo information can be shortened. A large improving effect of the lead-in operation time can be obtained. On the disk medium, as servo information in the landing area, second servo information having a servo pattern to which position information which can discriminate the position in the circumferential direction has been added is written in the same servo pattern as that of the first servo information in the data area. For example, on the disk medium, a servo pattern to which the position information which can discriminate the position in the circumferential direction has been added is written as second servo information in the landing area into a gray code of the first servo information. As position information of the second servo information, the position in the circumferential direction between sectors based on the first servo information is written or the position in the circumferential direction from index servo information on the medium is written.

The lead-in control unit obtains a deviation time for the first servo information on the basis of the position information of the second servo information upon completion of the lead-in of the servo detecting system based on the second servo information and changes the timing for turning on a subsequent servo gate signal SG by the deviation time, thereby synchronizing it with the first servo information. If the lead-in of the servo detecting system is completed by the sampling of the first servo information in the landing area, since this means that the synchronization has already been established, there is no need to change the lead-in timing. This point results in an advantage obtained in the case where the first and second servo information exist mixedly in the landing area.

On the disk medium, as servo information in the landing area, the second servo information having a servo pattern to which the position information which can discriminate the position in the circumferential direction has been added can be written into a servo pattern different from the first servo information. As a servo pattern different from the first servo information, for example, a servo pattern obtained by excluding burst information from the first servo information, a servo pattern obtained by excluding cylinder information from the first servo information, a servo pattern comprising a preamble and servo mark information, or a servo pattern comprising only the preamble is used as second servo information.

The invention provides a disk medium which is used for the disk apparatus having the ramp loading mechanism and is characterized in that the servo information has been written in the landing area on the medium. That is, it is characterized in that the second servo information is written in the landing area on the medium at the finer interval than that of the first servo information written in the data area. The details of the disk medium are fundamentally the same as those in case of the apparatus.

The above and other objects, features, and advantages of the present invention will become more apparent from the following detailed description with reference to the drawings.

BRIEF DESCRIPTION OF THE DRAWINGS

FIGS. 6A to 6D are explanatory diagrams of a servo lead-in in the landing area according to the invention;

DETAILED DESCRIPTION OF THE PREFERRED EMBODIMENT

Figure 1:
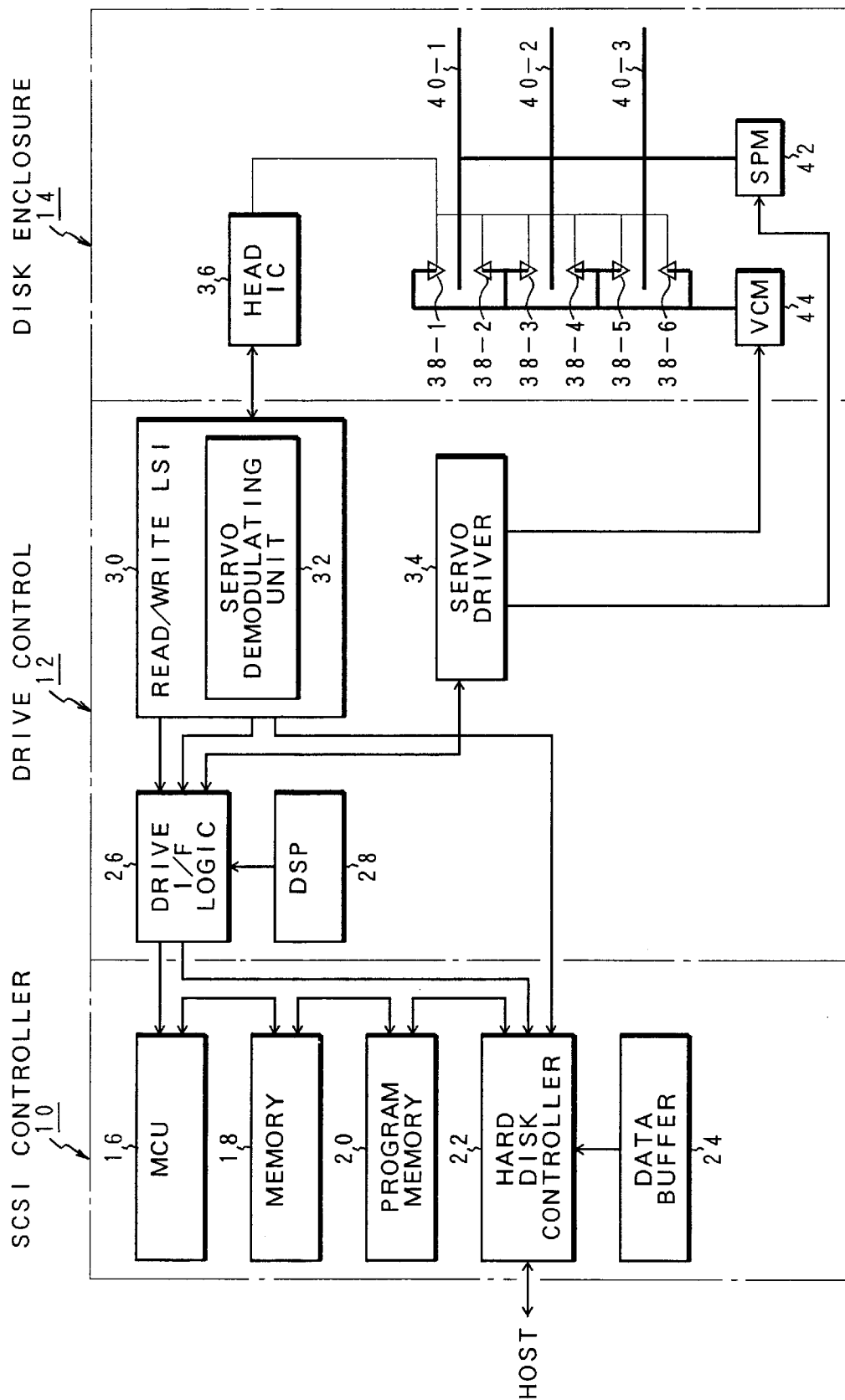
FIG. 1 is a block diagram of a hard disk drive to which the invention is applied.

FIG. 1 is a block diagram of a hard disk drive to which the invention is applied. The hard disk drive comprises an SCSI controller 10, a drive control 12, and a disk enclosure 14. An interface with a host is not limited to the SCSI controller 10 but a proper interface controller can be used. The SCSI controller 10 has: an MCU (main control unit) 16; a flash memory 18 which is used as a control storage; a program memory 20 in which a control program has been stored; a hard disk controller (HDC) 22; and a data buffer 24. The drive control 12 has: a drive interface logic 26; a DSP 28; a read/write LSI 30 which has a servo demodulating unit 32 and functions as a read channel (RDC); and a servo driver 34. The disk enclosure 14 has a head IC 36. Combination heads 38-1 to 38-6 each having a write head and a read head are connected to the head IC 36. The combination heads 38-1 to 38-6 are supported to a tip of an arm of a rotary actuator, provided for respective recording surfaces of disks 40-1 to 40-3, and moved to arbitrary track positions on the disks 40-1 to 40-3 by the driving of the rotary actuator by a VCM 44. In the hard disk drive of the invention, a ramp loading mechanism is provided on a head moving locus on the opposite side of the disks 40-1 to 40-3. The unloading operation such that the combination heads 38-1 to 38-6 are moved to positions over the ramps and stopped there at the time of activation of the hard disk drive or in the access waiting mode from the host is performed. When the apparatus receives a write command or a read command from the host in the unloading state, the loading operation is started, the combination heads 38-1 to 38-6 are moved from the ramps to the landing area toward the maximum values of the disks 40-1 to 40-3 by a speed control of the VCM 44, and a servo lead-in is performed. After that, the head is positioned to a target position by a command from the host upon completion of the servo lead-in. The disks 40-1 to 40-3 are rotated at a constant velocity by a spindle motor 42.

The operation of the hard disk drive is executed as follows. For example, a case where the write command is issued from the host will be explained. The write command is stored in a command queue in the flash memory through the hard disk controller 22. The MCU 16 extracts the write command from the head position of the command queue in the flash memory 18 and requests the host to transfer the write command by using the hard disk controller 22. The write command transferred from the host is stored in the data buffer 24. When the writing of write data to the data buffer 24 is finished, the MCU 16 activates the hard disk controller 22 and writes the write data to the disks 40-1 to 40-3. Upon writing, the write data stored in the data buffer 24 is written to a sector position of a track designated by the write command by using the write head provided for, for example, the combination head 38-1 through the writing system comprising the hard disk controller 22, drive interface logic 26, and read/write LSI 30 and via the head IC 36. At the same time, the DSP 28 controls the positioning operation of the head by the VCM 44 to the track position designated by the write command, namely, controls the servo driver 34 by a servo demodulation signal obtained through the servo demodulating unit 32 and executes the writing operation of the write data to the disk when the combination head 38-1 is positioned to the target sector designated by the write command. When such a writing operation is finished, the MCU 16 notifies the host of a status indicative of the normal end of the write command through the hard disk controller 22. When the read command is issued from the host, the MCU 16 extracts the read command and reproduces the data written at the sector position of the track designated by the read command by using the read head provided for, for instance, the combination head 38-1 through the reading system comprising the hard disk controller 22, drive interface logic 26, and read/write LSI 30 and via the head IC 36.

The MCU 16 transfers the read-out data to the host. Further, in the access waiting mode in which the write command or read command is not issued from the host, the MCU 16 instructs the DSP 28 to execute an unloading process for unloading the head from the ramp loading mechanism. Therefore, the DSP 28 makes the VCM 44 operative by the drive interface logic 26 and servo driver 34, moves the combination heads 38-1 to 38-6 to positions over the ramps of the ramp loading mechanisms arranged closely in the outer peripheral portions on the outer side of the disks 40-1 to 40-3, and turns off the drive current of the VCM 44 in a state where the heads are stopped at the outer pressing positions on the ramps. When the command is received from the host in the unloading state where the heads are positioned and stopped to the ramp loading mechanisms as mentioned above, the DSP 28 first performs a ramp loading control for moving the head from the ramp over the disk on the basis of the instruction of the MCU 16 and executes a servo lead-in for properly making adjustments of the AGC and PLL of the variable gain amplifier (VGA) provided for the read/write LSI 30 during the movement of the head in the landing area on the disk. When the head is moved from the landing area to the data area in which data can be read/written, the DSP 28 performs a seek control for moving the laser beam toward the target sector designated by the command so as to enter an on-track state and, thereafter, positions the head to the sector position. At the time of the ramp loading for moving the combination heads 38-1 to 38-6 from the positions over the ramps to the positions over the disk by the driving of the VCM 44, the head position cannot be detected from the servo information of the disks 40-1 to 40-3 according to the servo demodulating unit 32. Therefore, a head speed signal is detected from a counter electromotive voltage of the VCM 44 and a ramp speed control of, for example, a speed which is equal to or smaller than 1/10 of a head speed at the time of the seek control is executed.

Figure 2:
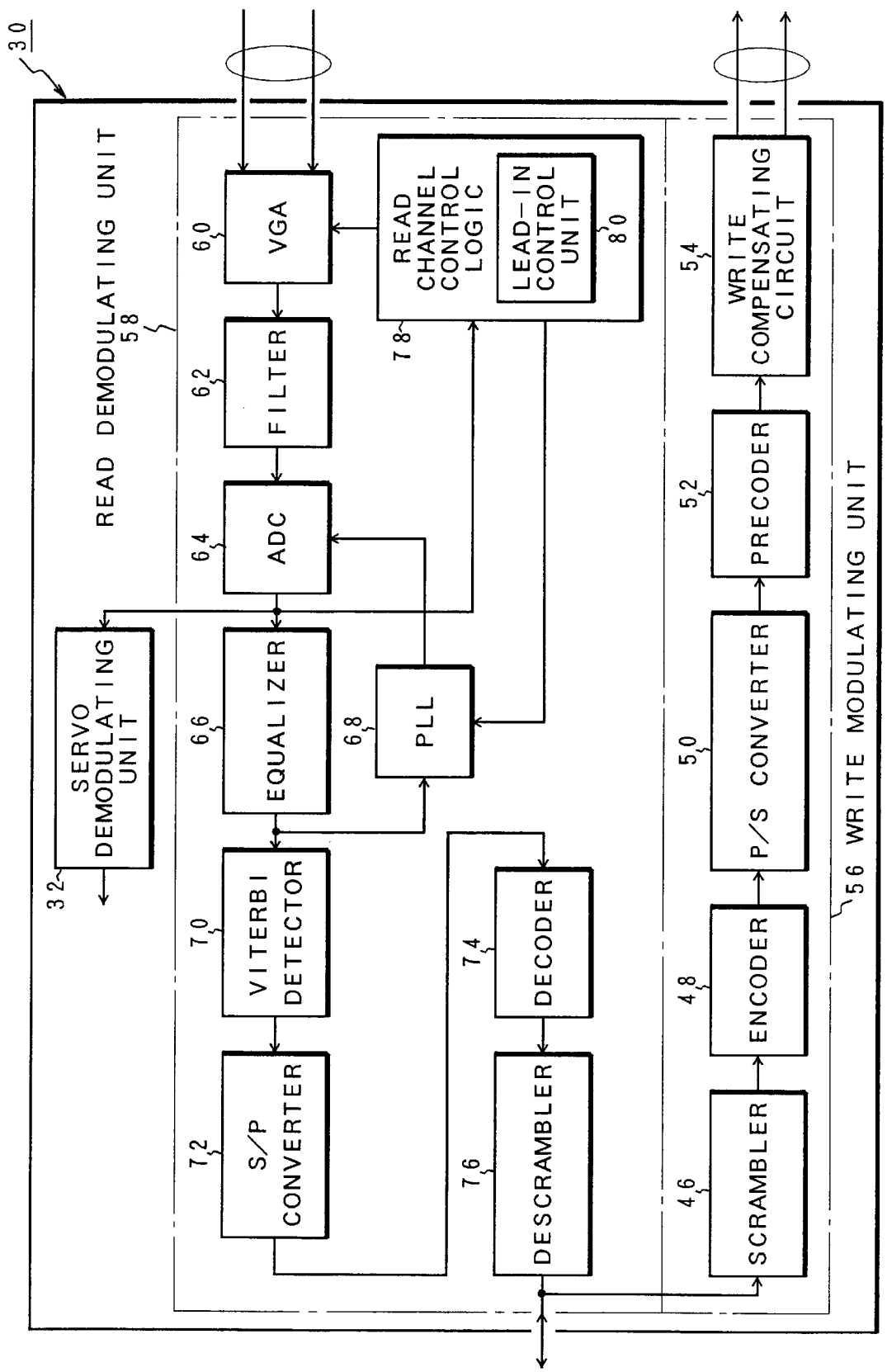
FIG. 2 is a block diagram of a read/write LSI in FIG. 1.

FIG. 2 is a block diagram of the read/write LSI 30 in FIG. 1 and it is usually known as a read channel. The read/write LSI 30 is constructed by the servo demodulating unit 32, a write modulating unit 56, and a read demodulating unit 58. The write modulating unit 56 is constructed by a scrambler 46, an encoder 48, a parallel/serial (P/S) converter 50, a precoder 52, and a write compensating circuit 54. In the operation of the write modulating unit 56, the write data formatted by the hard disk controller 22 in FIG. 1 is received and first subjected to a scrambling process on the basis of the EX-OR with a pseudo random pattern by the scrambler 46. Since a sector format of the write data is constructed by, for example, a gap, a pilot, sync bytes, data bytes, an ECC, and a gap, the scrambler 46 scrambles the portions of the data bytes and the ECC. Subsequently, the scrambled data is converted into, for example, an 8/9 code by the RLL encoder 48. For example, the byte data so far is subsequently converted into serial data by the P/S converter 50. In the precoder 52, assuming that, for example, a maximum likelihood detection of a Partial Response (PRML) was performed on the side of the read demodulating unit 58, since an equalization of (1+D) is performed upon reproduction, an arithmetic operation of 1/(1+D) is preliminarily performed by the precoder 52 upon recording. D denotes a delay arithmetic operation value. The write compensating circuit 54 executes a write compensation such that a write timing is slightly deviated in order to previously compensate a non-linear distortion of a magnetic medium which is caused when a recording frequency is high. The read demodulating unit 58 will now be described. The read demodulating unit 58 is constructed by: a variable gain amplifier (VGA) 60 for performing an AGC control; a filter 62; an A/D converter 64; an equalizer 66; a PLL 68 having a VFO (variable frequency oscillator) therein; a Viterbi detector 70; a serial/parallel (S/P) converter 72; an RLL decoder 74; a descrambler 76; and a read channel control logic 78. The operation of the read demodulating unit 58 is as follows. An analog read signal generated from the head is amplified by the VGA 60 on the basis of an automatic gain control (AGC), thereafter, band controlled in accordance with low pass characteristics of the filter 62, and converted into digital read data by the A/D converter 64 on the basis of a sampling clock from the PLL 68. The equalizer 66 performs an equalization of (1+D) to the read data. The read data is demodulated by the Viterbi detector 70 in accordance with a Viterbi algorithm. The PLL 68 controls a frequency of the sampling clock to the A/D converter 64 synchronously with the read data equalized in the equalizer 66.

The read data demodulated by the Viterbi detector 70 is converted into parallel data of, for example, a byte unit by the S/P converter 72, subjected to an 8/9 inverse conversion by the RLL decoder 74, and further, descrambled with respect to an ECC portion of the data bytes by the descrambler 76 by using a pseudo random code. The demodulated read data is outputted to the hard disk controller 22 in FIG. 1 and transferred to an upper apparatus through the data buffer 24. The read channel control logic 78 receives a control signal from the hard disk controller 22 in FIG. 1, performs a lead-in control at the time of loading the head from the ramp loading mechanism to the landing area on the disk, and controls the reading operation based on a read gate signal RG from the hard disk controller 22, the writing operation based on a write gate signal WG, and further, the servo demodulating operation based on a servo gate signal SG for deciding a servo interruption timing.

In the hard disk drive of the invention, a lead-in control unit 80 is provided for the read channel control logic 78, and when the head is moved from the ramp to the landing area on the medium, a servo lead-in is performed on the basis of second servo information written at a finer interval than that of first servo information written in the data area.

Figure 3:
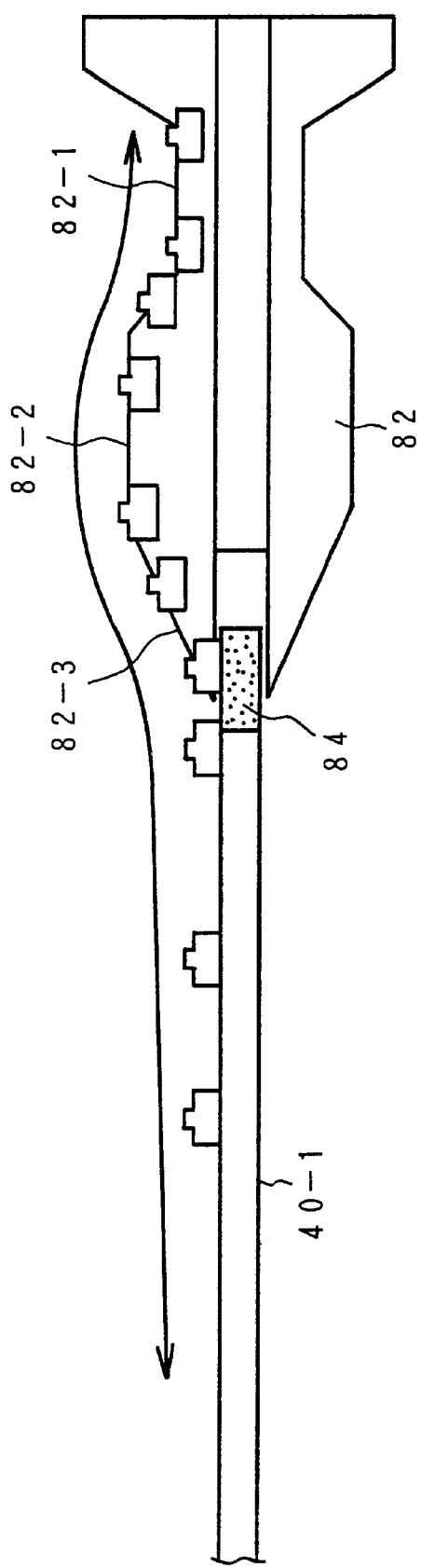
FIG. 3 is an explanatory diagram of the ramp loading operation.

FIG. 3 is an explanatory diagram of the ramp loading mechanism which is used in the hard disk drive of the invention. A ramp 82 is provided on a locus of the head which is moved by the rotary actuator outside of the disk 40-1. In the ramp 82, an inclined path 82-3 is formed for a landing area 84 in an outer peripheral portion of the disk 40-1, subsequently, a horizontal path 82-2 is formed on the outer side, and a stop portion 82-1 for stopping and holding the head is formed outside of the horizontal path 82-2. The head is stopped at a position where it is pressed to the outer side of the stop portion 82-1 in the unloading state. In case of receiving the command from the host and loading to the disk 40-1, the head is moved from the stop portion 82-1 toward the disk 40-1 side while performing a speed control by supplying an inner ejection current to the VCM. The head passes from the horizontal path 82-2 to the inclined path 82-3 and is loaded to the landing area 84 on the disk 40-1. While the head is moving in the landing area 84, the servo lead-in is performed for adjustment of the proper values in the AGC and PLL. After completion of the movement of the head from the landing area 84 toward the data area where the recording/reproduction is performed, a position control is performed to the sector position on the track designated by the command.

Figure 4:
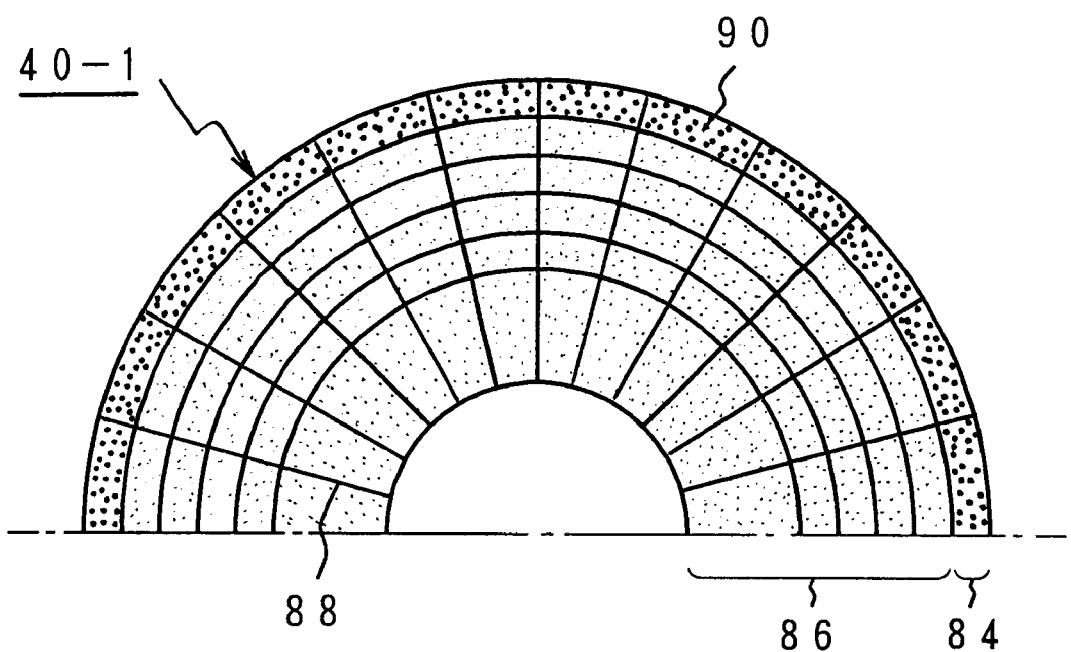
FIG. 4 is an explanatory diagram of a servo frame of a disk medium which is used in the invention.

FIG. 4 is a plan view of the disk 40-1 in FIG. 3 and shows the half thereof. The disk 40-1 has a data area 86 for recording/reproducing data to/from the inside of the outer peripheral landing area 84. First servo patterns 88 are written in the data area 86 so as to be divided in the circumferential direction. The first servo pattern 88 is expressed as an area which extends as a bold line from the center in the radial direction. In the embodiment, the first servo patterns 88 extend to the landing area. Second servo patterns 90 are written between the first servo patterns 88 extending to the landing area 84 so as to be arranged at a finer interval than that in the circumferential direction of the first servo pattern 88.

Figure 5A:
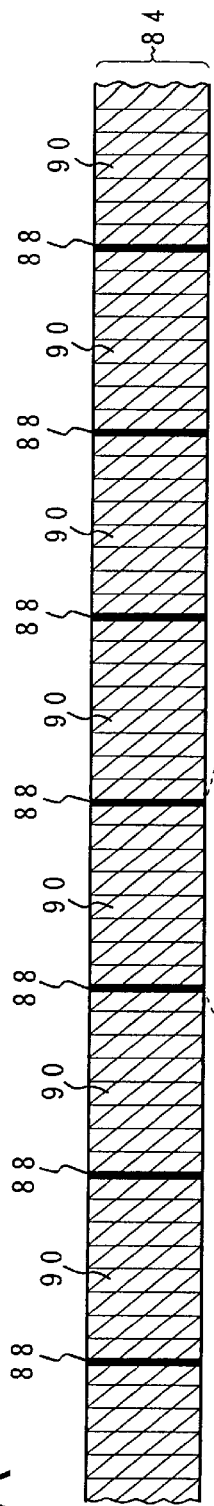
FIGS. 5A to 5C are explanatory diagrams of a servo pattern written in a landing area in FIG. 4.
Figure 5B:
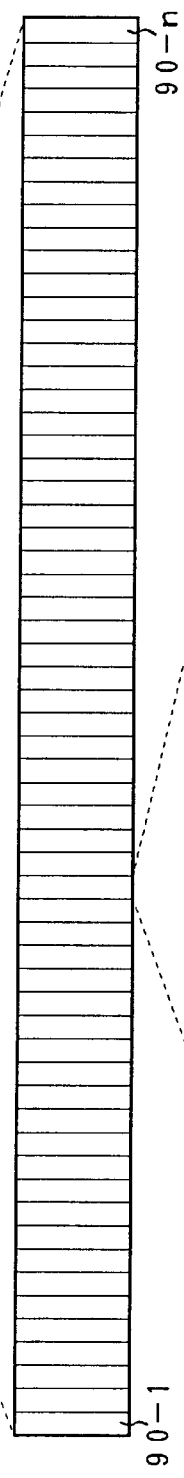
Figure 5C:
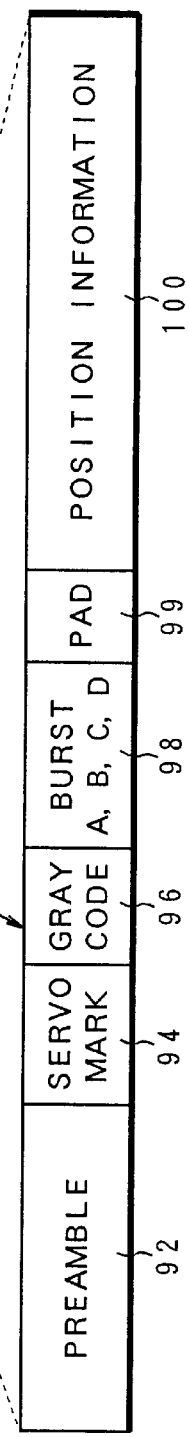

FIGS. 5A to 5C are enlarged diagrams of the first servo patterns 88 and second servo patterns 90 written in the landing area 84 in FIG. 4. FIG. 5A shows the servo patterns in the landing area 84. As enlargedly shown in FIG. 5B, the second servo patterns 90 are stored at a finer interval in the area between the first servo patterns 88 recorded in the radial direction from the data area shown by the bold line. In the embodiment, as for the second servo patterns written between the first servo patterns 88, as shown in second servo patterns 90-1 to 90-n, a plurality of patterns are written between the first servo patterns 88 so that an area therebetween is completely filled with the second servo patterns. Thus, the second servo patterns 90 are written between the first servo patterns 88 over the whole circumference of the landing area 84. According to a servo format of the second servo pattern, as representatively illustrated by a second servo pattern 90-i in FIG. 5C, there are sequentially written: a preamble 92; a servo mark 94; a gray code 96 indicative of a cylinder address; a burst 98 in which four kinds of burst patterns A, B, C, and D obtained as a double-phase servo have been written; a pad 99; and further, position information 100 showing the position in the circumferential direction of the second servo pattern 90-i between the sectors serving as an area between the first servo patterns 88. The format from the preamble 92 to the pad 99 in the second servo pattern 90-i is the same servo format as that of the first servo patterns 88 radially recorded from the data area to the landing area 84. In the second servo patterns 90, the position information 100 is added to the same servo format as that of the first servo pattern 88. When the servo lead-in is completed in one of the second servo patterns 90, the position information 100 is used for obtaining the deviation time for the first servo pattern 88, changing the subsequent lead-in timing by the deviation time, and synchronizing it with the lead-in timing of the first servo pattern 88.

FIGS. 6A to 6D are diagrams for explaining the servo lead-in operation in the landing area according to the invention. FIG. 6A shows the servo pattern of the landing area 84. For simplicity of explanation, FIG. 6A shows an example in the case where, for instance, ten second servo patterns 90-1 to 90-10 have been written between first servo patterns 88-1 and 88-2. An interval between the head of the first servo pattern 88-1 and the head of the next first servo pattern 88-2 is an ordinary servo interval 118 on the data surface. The servo interval 118 is shown by the number of fundamental clocks which are used for the servo control. Since the ten second servo patterns 90-1 to 90-10 are written in the ordinary servo interval 118 in addition to the first servo pattern 88-1, the ordinary servo interval 118 has a servo interval 120 with respect to each servo pattern. With respect to the servo pattern in the landing area 84 as shown in FIG. 6A, it is now assumed that the head is moved by the speed control and enters the landing area 84 and, during the movement of the head, the servo lead-in is started, and the servo lead-in based on, for example, the second servo pattern 90-4 is completed as shown in FIG. 6B. A deviation time Td for the next first servo pattern 88-2 is calculated as shown in FIG. 6C from the position information 100 in the circumferential direction in FIG. 5C written in the second servo pattern 90-4 serving as a lead-in completion position 122. As position information 100 in the circumferential direction in FIG. 5C, for example, the number of clocks indicative of the position between the sectors between the first servo patterns 88-1 and 88-2 is written. Since the number of clocks in the ordinary servo interval 118 for a time interval from time t1 to time t3 in FIG. 6A has been predetermined, the number of clocks of the deviation time Td for the next first servo pattern 88-2 can be calculated by subtracting the number of clocks of the position information in the circumferential direction of the second servo pattern 90-4 at the lead-in completion position 122 from the number of clocks of the ordinary servo interval 118. If the deviation time Td regarding the second servo pattern 90-4 at the lead-in completion position 122 can be calculated as mentioned above, by deviating a servo interruption timing (timing for turning on the servo gate signal SG) by the deviation time Td, the servo interruption timing can be matched with the first servo pattern 88-2 common to the data area after completion of the servo lead-in based on the second servo pattern 90-4 as shown in FIG. 6D. After that, even in the landing area 84, the servo interruption timing can be synchronized with the first servo patterns 88-1, 88-2, ... sequel to the data area.

Figure 7:
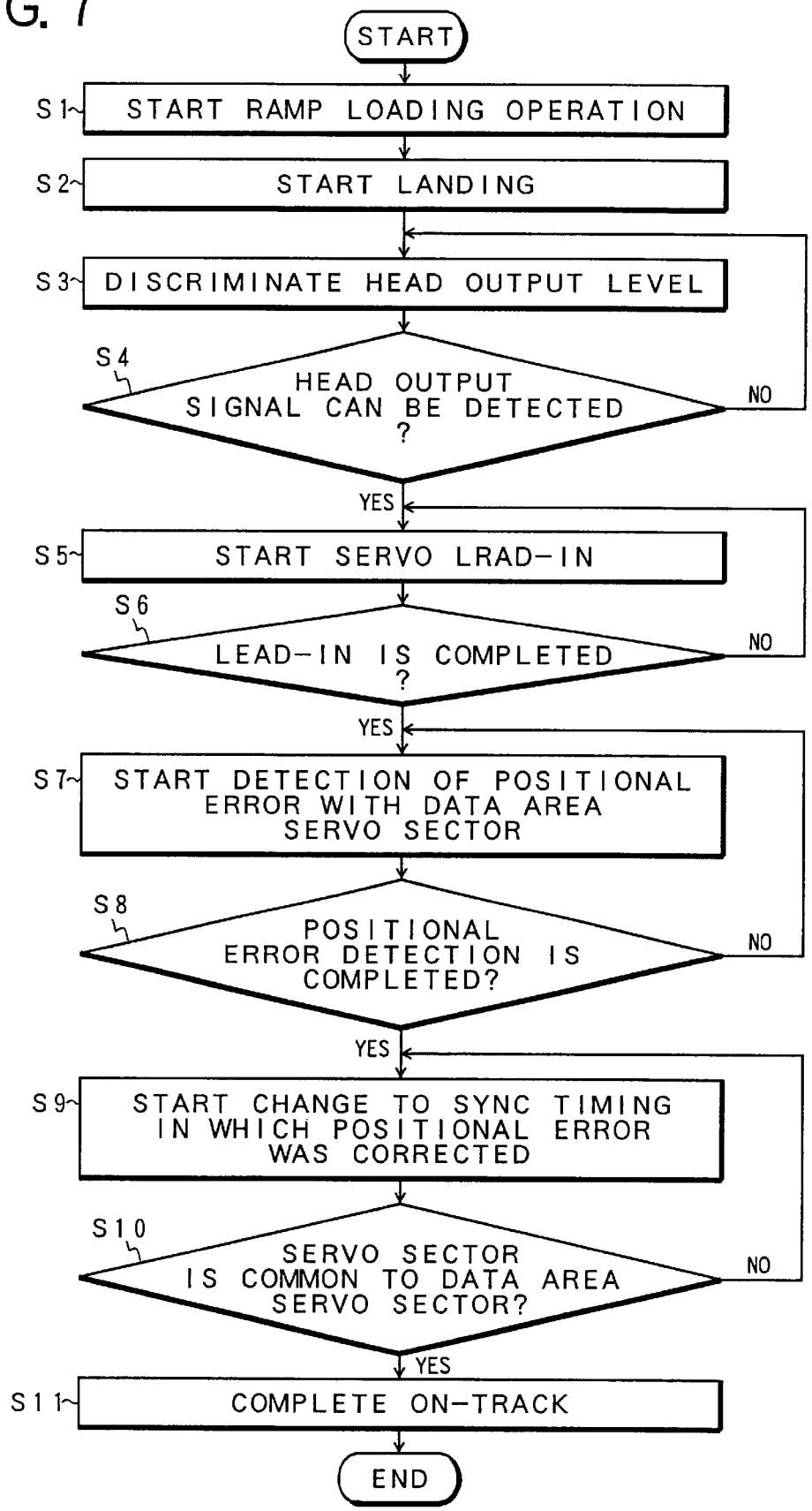
FIG. 7 is a flowchart for a ramp loading process of the invention.

FIG. 7 is a flowchart for a ramp loading process of the invention according to the lead-in control unit 80 provided for the read channel control logic 78 in FIG. 2. First, in step S1, the ramp loading operation is started on the basis of the reception of the host command. As shown in FIG. 3, the head is moved from the ramp 82 to the landing area 84 on the disk 40-1 by controlling the speed. The landing is started in step S2. When the head is moved to the landing area 84, since the second servo patterns 90 have been written in the landing area 84 on the whole circumference so as to fill the area between the first servo patterns 88 from the data area 86 as shown in FIG. 4, a head output level is discriminated in step S3 with respect to a head output by the reading of the first servo patterns 88 and second servo patterns 90. Whether the head output level is a detectable level or not is discriminated in step S4. When a state where the head output signal can be detected is obtained, the servo lead-in is started in step S5. At the start of the servo lead-in, for example, as shown in FIG. 6A, with respect to the repetition of the interval between the sectors of the first servo pattern 88-1 and second servo patterns 90-1 to 90-10 in the landing area 84, the proper adjustments of the AGC and PLL are made by using the read signal of the preamble 92 in FIG. 5C locating at the head of each servo signal. By the start of the servo lead-in in step S5, the servo lead-in using the preambles 92 of the continuous second servo patterns is repeated. When the AGC and PLL are adjusted to the proper values, the completion of the servo lead-in is decided in step S6 and step S7 follows. In step S7, with respect to the second servo patterns 90 by which the servo lead-in has been completed, on the basis of the position information 100 in the circumferential direction written after the servo pattern as shown in FIG. 5C, a process for detecting the position error from the data area servo sector, namely, the deviation time from the next first servo pattern as shown in FIG. 6C is started. When the detecting process is completed in step S8, a timing change for synchronizing the servo interruption timing obtained by correcting the position error of the second servo pattern by which the lead-in has been completed with the first servo pattern is started in step S9. If it can be changed to the timing of the first servo pattern serving as a servo sector common to the servo sector in the data area in step S10, step S11 follows. The on-track operation is completed. The ramp loading process accompanied with a series of servo lead-in is finished.

Figure 8:
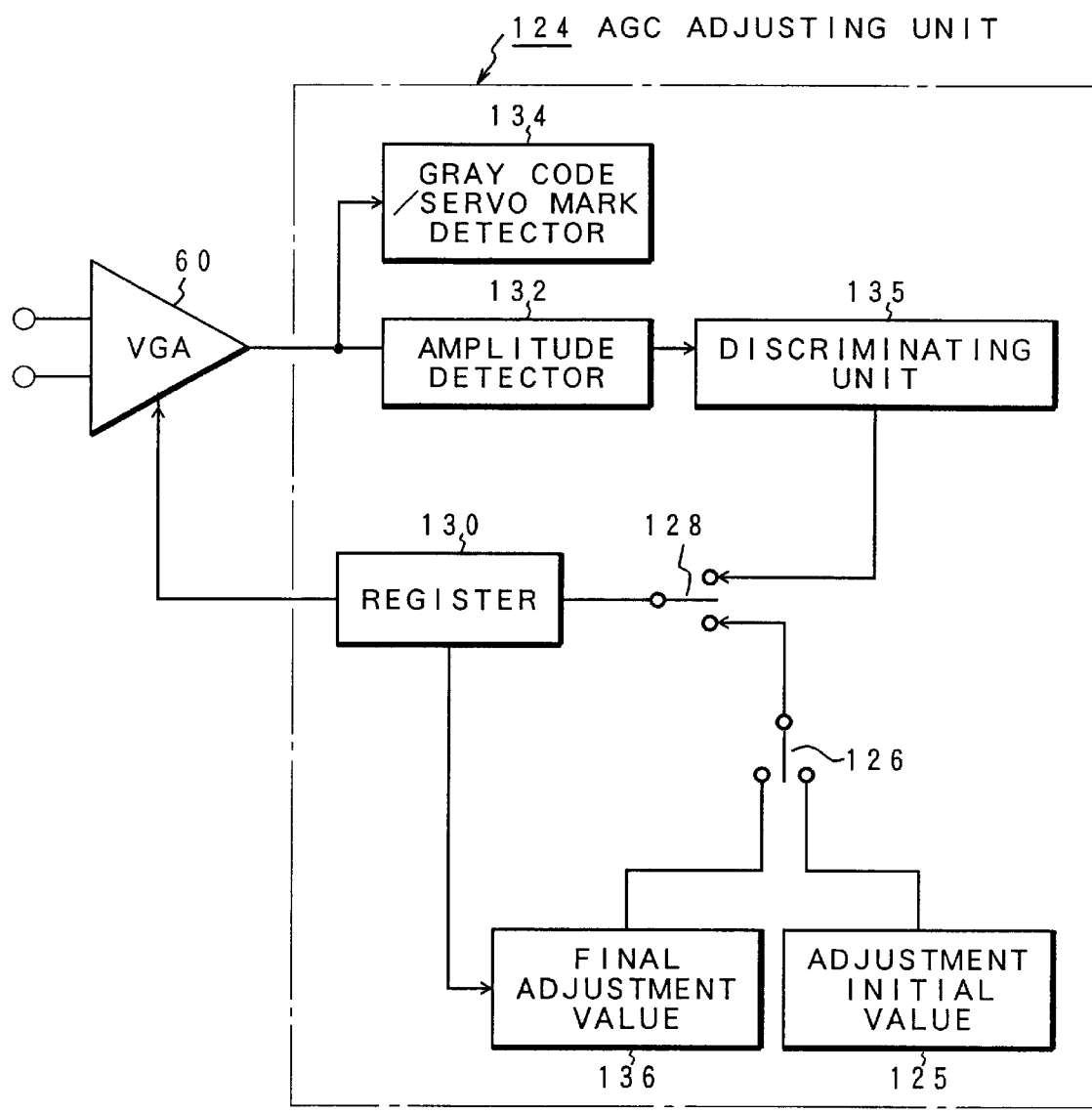
FIG. 8 is a block diagram of an AGC control function which is used in the invention.

FIG. 8 is a block diagram of an AGC control function which is used for the servo lead-in control of the invention. An AGC adjusting unit 124 is provided for the VGA 60. The AGC adjusting unit 124 constructs a part of the lead-in control unit 80 of the read channel control logic 78 in FIG. 2. The AGC adjusting unit 124 is constructed by: an adjustment initial value setting device 125; a discriminating unit 135; a final adjustment value setting device 136; change-over switches 126 and 128; and a register 130. An adjustment initial value in a program is stored in the adjustment initial value setting device 125. An adjustment value in the register 130 at a point when the preamble read out from the servo pattern at the time of lead-in is finished is stored as a final adjustment value in the final adjustment value setting device 136. When the AGC control of the VGA 60 is started at the beginning of the servo lead-in, the change-over switch 126 has been switched to the side of the adjustment initial value setting device 125. After the next and subsequent times, since the final adjustment value has been obtained, the switch 126 is switched to the side of the final adjustment value setting device 136. The change-over switch 128 is switched to the side of the change-over switch 126 at the start of the servo lead-in, thereby allowing the adjustment initial value or previous adjustment initial value to be fetched in the register 130. When the preamble of the servo pattern is obtained, the switch 128 is switched to the side of the discriminating unit 135. The gain control value obtained from the discriminating unit 135 is fetched during the adjustment and the gain of the VGA 60 is controlled so that an amplitude is set to a proper value. An amplitude detector 132 detects an amplitude of the servo read signal obtained from the VGA 60, compares it with the proper value of the discriminating unit 135, and obtains the next gain control value. An output of the VGA 60 is also supplied to a gray code/servo mark detector 134. By the gray code/servo mark detector 134, the position information 100 in the circumferential direction provided at the end of the second servo pattern 90-i in FIG. 5C can be detected. That is, as position information 100 in the circumferential direction, since position information in the circumferential direction is written, the position information 100 in the circumferential direction of the second servo pattern can be detected by the gray code/servo mark detector 134.

Figure 9:
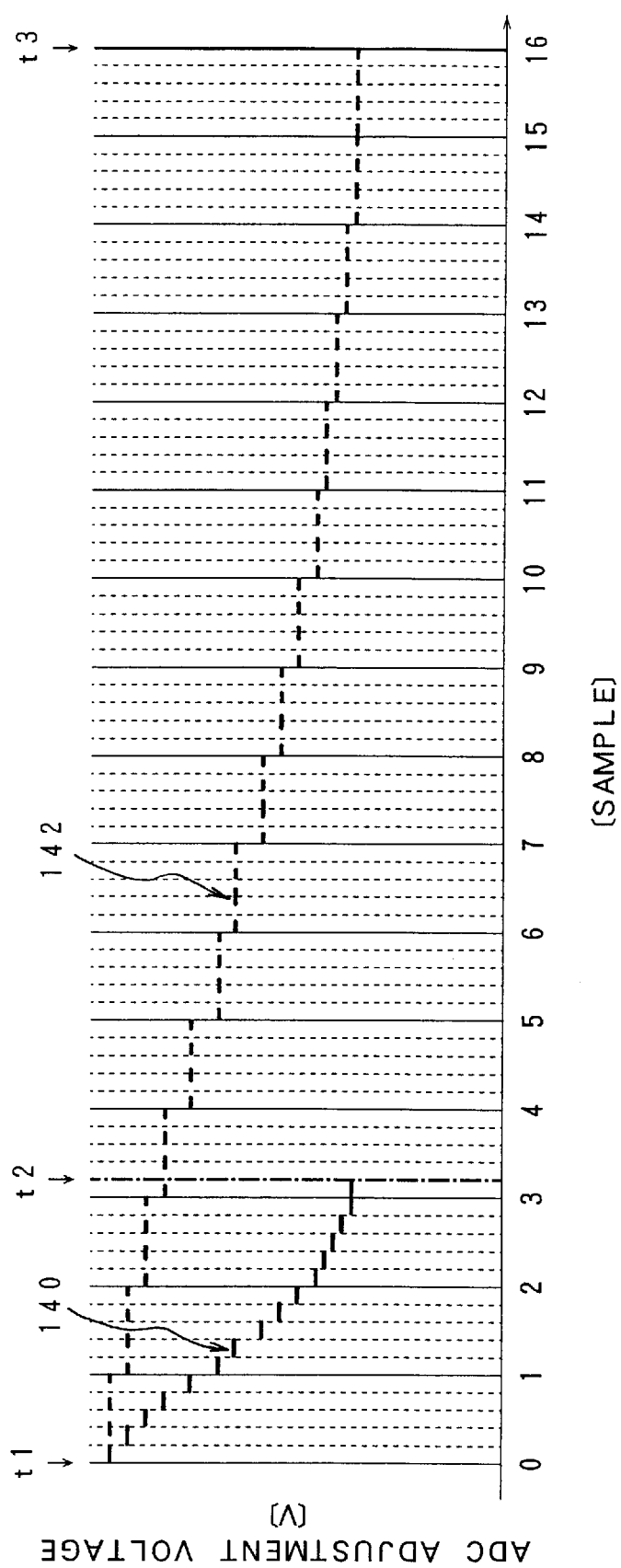
FIG. 9 is an explanatory diagram showing a comparison between the number of samples in the AGC control operation according to the invention and conventional one.

FIG. 9 shows the servo lead-in operation according to the invention using the AGC adjusting unit 124 in FIG. 8 together with the conventional servo lead-in. In FIG. 9, an axis of abscissa denotes the number of samples of the servo pattern and an axis of ordinate indicates the ADC adjustment voltage showing a signal amplitude. The numerical value of the number of samples shown on the axis of abscissa in FIG. 9 is equal to the number of samples corresponding to the first servo pattern 88 written in the data area 86 in FIG. 4. A case where five second servo patterns 90 are written between the first servo patterns 88 is shown as an example. That is, the second servo patterns are written at an interval which is ⅕ of the servo interval (sector interval) of the first servo pattern 88. In a servo lead-in operation 140 of the invention, the head is moved to the landing area and the servo lead-in is started at time t1. For example, the amplitude obtained as an ADC adjustment voltage by sampling the servo patterns 16 times reaches the proper value, and the servo lead-in is completed. That is, the AGC control is performed by continuously sampling the first and second servo patterns by the servo lead-in from time t1. The servo lead-in is completed at time t2 when the number of sampling times reaches 16. On the other hand, in a conventional servo lead-in operation 142 using only the first servo pattern 88, assuming that servo lead-in is started from time t1, the servo lead-in is completed at time t3 by the sampling operation 142 of 1 to 16 times shown by the numerical value of the number of samples shown on the axis of abscissa. As will be obviously understood from FIG. 9, in the servo lead-in operation 140 in the invention, the servo lead-in can be completed in a short time that is equal to ⅕ corresponding to the number (5) of servo patterns between the sectors as compared with the case of the conventional servo lead-in operation 142. Actually, since the number of second servo patterns which can be recorded between the sectors serving as a write interval of the first servo patterns is sufficiently large, the servo lead-in can be completed in a very short time.

Figure 10:
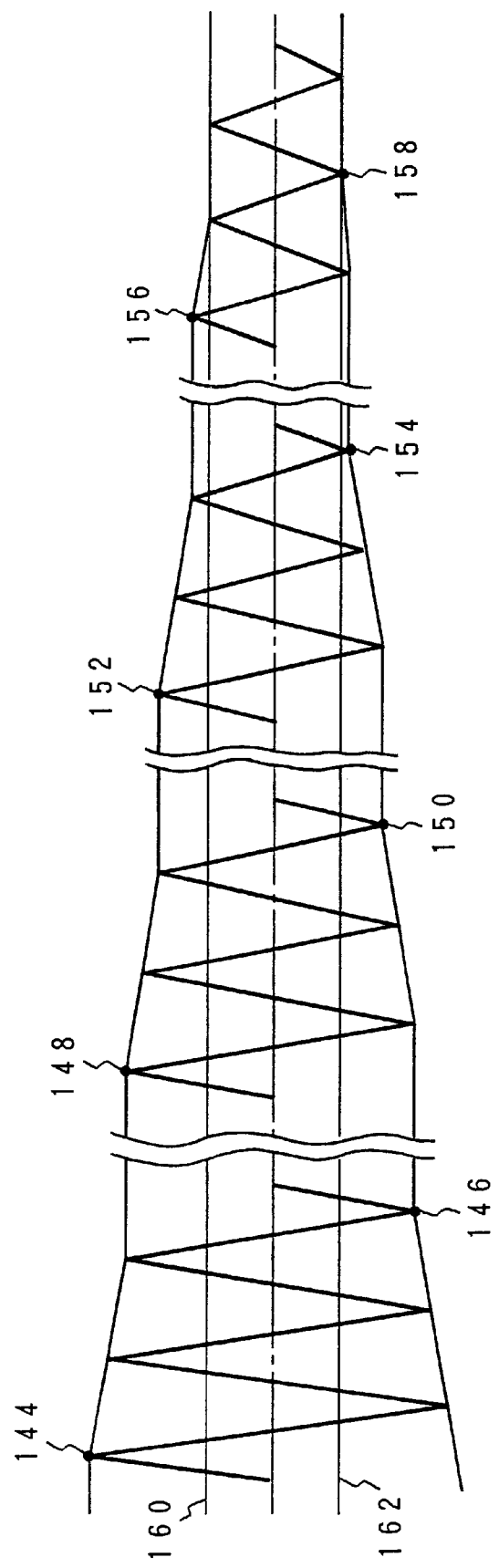
FIG. 10 is a time chart for amplitude normalization by the AGC control in FIG. 8.

FIG. 10 shows a change in output signal amplitude of the VGA 60 which is obtained by the adjusting operation by the AGC adjusting unit 124 in FIG. 8. First, with respect to a signal point 144 at which the servo lead-in is started, the adjustment initial value of the adjustment initial value setting device 125 in FIG. 8 is set into the register 130 through the change-over switches 126 and 128. The gain of the VGA 60 is adjusted to the initial value. The read signal by the VGA 60 subjected to the gain control based on the adjustment initial value by the register 130 is supplied to an amplitude detector and its amplitude is detected and compared with proper amplitude values 160 and 162 by the discriminating unit 135. If the detected amplitude does not reach the proper values 160 and 162, a process for setting a new adjustment value into the register 130 through the change-over switch 128 so as to reduce the gain in case of, for example, FIG. 10 is repeated. Such an AGC control process is executed while the preambles of the servo patterns are obtained. When the preamble is not obtained at a signal point 146, the adjustment value set in the register 130 at that time is set into the final adjustment value setting device 136 and the apparatus waits for the next AGC control. When the preamble of the next servo pattern is obtained at a signal point 148, in this case, the previous final adjustment value held in the final adjustment value setting device 136 is set into the register 130 through the change-over switches 126 and 128. A process for changing the adjustment value for the register 130 so as to obtain the proper amplitude values 160 and 162 by the amplitude detector 132 and discriminating unit 135 by using the previous final adjustment value as an initial value is continued until a signal point 150 where no preamble is obtained. This point is also similarly applied to an interval between signal points 152 and 154. Such a process is repeated each time the preamble of the servo pattern is obtained. When the amplitude of the VGA 60 is finally adjusted to the proper values 160 and 162 at a signal point 158 by the adjustment from a signal point 156, the lead-in of the servo detecting system is completed at this time point.

Figure 11:
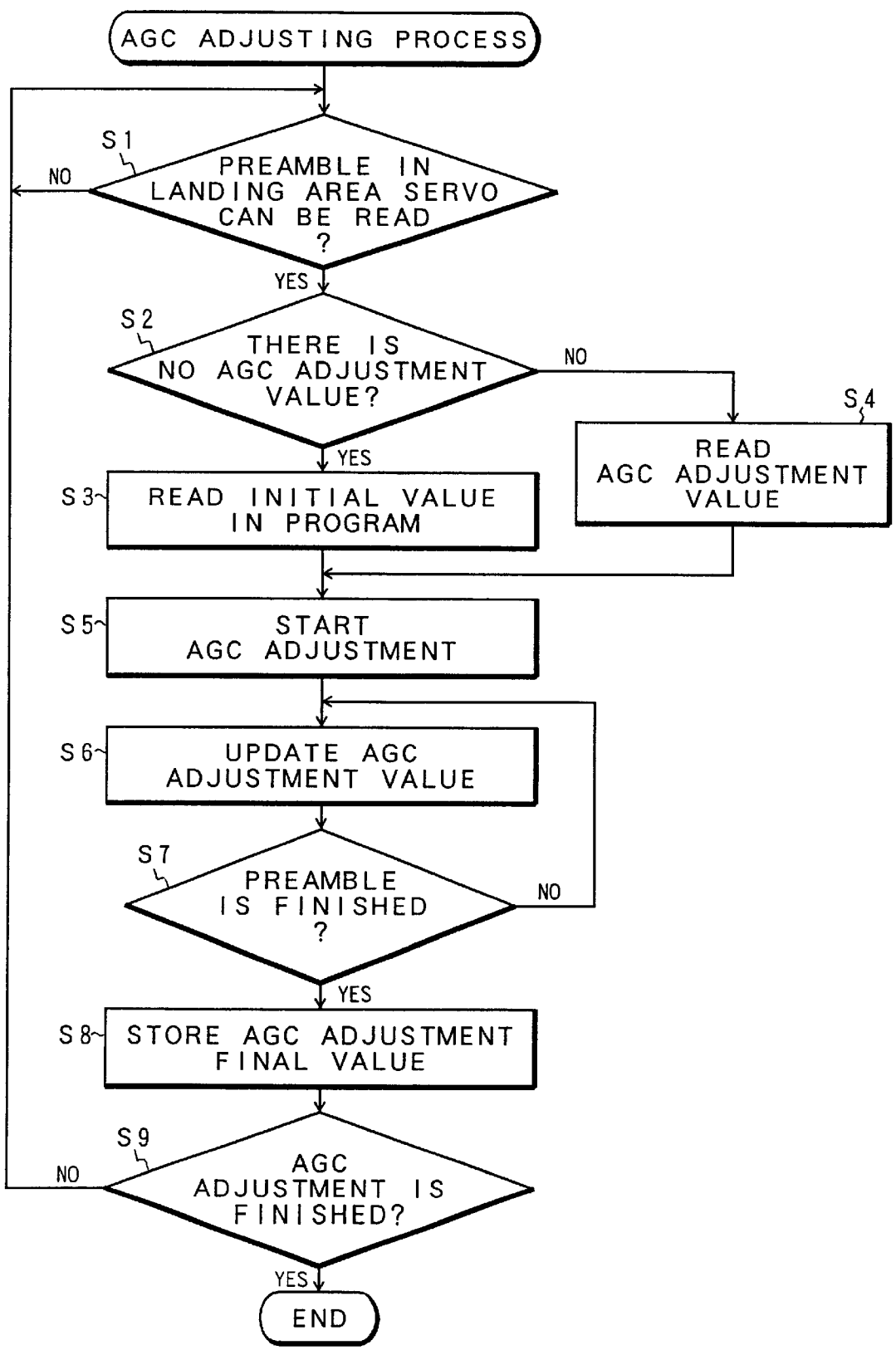
FIG. 11 is a flowchart for an AGC gain control process according to FIG. 8.

FIG. 11 is a flowchart for a gain control process by the AGC adjusting unit 124 in FIG. 8. In the gain control process of the VGA, whether the preamble of the servo pattern in the landing area can be read or not is discriminated in step S1. When the head reaches the servo area in the landing area and the head preamble can be read, the presence or absence of the AGC adjustment value is discriminated in step S2. Since there is not an AGC adjustment value at the initial time, the initial value in the program is read out in step S3. Since there is the previous holding value after the second and subsequent times, the AGC adjustment value held in the previous adjustment is read out in step S4. Subsequently, in step S5, the amplitude of the VGA amplifier is detected and the AGC control is started. When the amplitude does not reach the specified level, the AGC adjustment value is updated in step S6. The updating of the AGC adjustment value in step S6 is repeated until the preamble of the servo pattern is finished in step S7. When the preamble is finished, the final AGC adjustment value is held in step S8 and the apparatus waits for the next adjustment. If the amplitude of the VGA does not reach the amplitude corresponding to the gain proper value in step S9, the processing routine is returned to step S1. A similar process is repeated with respect to the preamble of the next servo pattern. If the amplitude reaches the amplitude corresponding to the gain proper value, the AGC control is finished and the servo lead-in is completed.

Figure 12A:
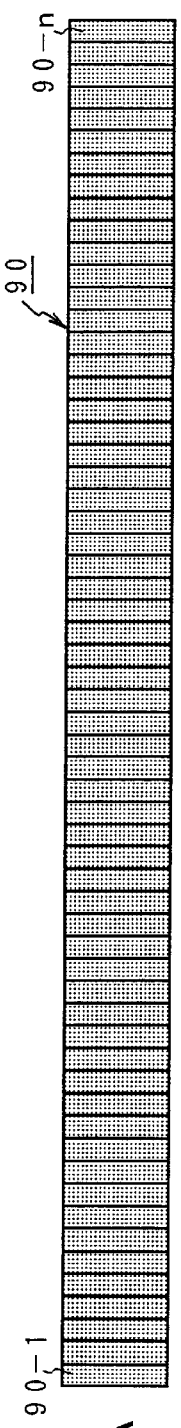
FIGS. 12A to 12E are explanatory diagrams of kinds of servo patterns to be written in the landing area in the invention.
Figure 12B:
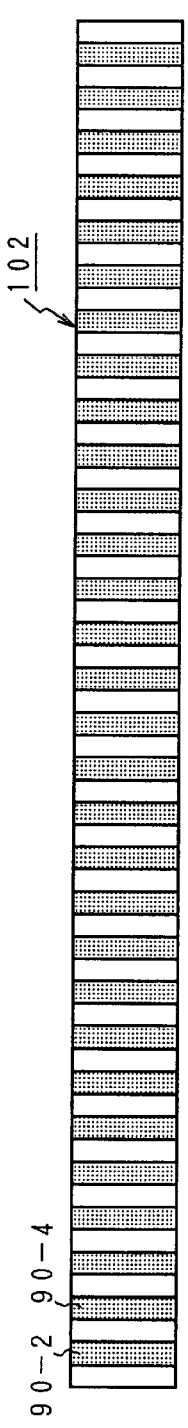
Figure 12C:
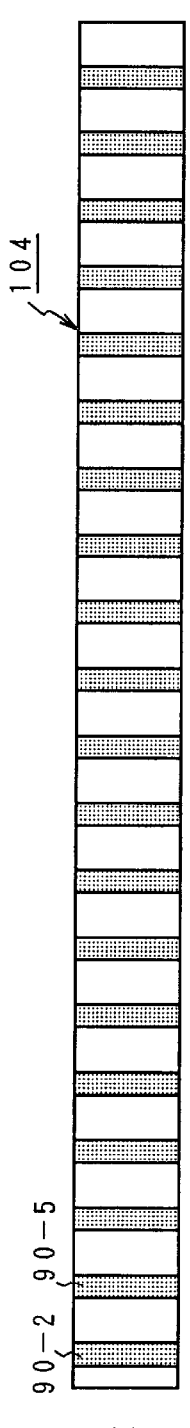
Figure 12D:
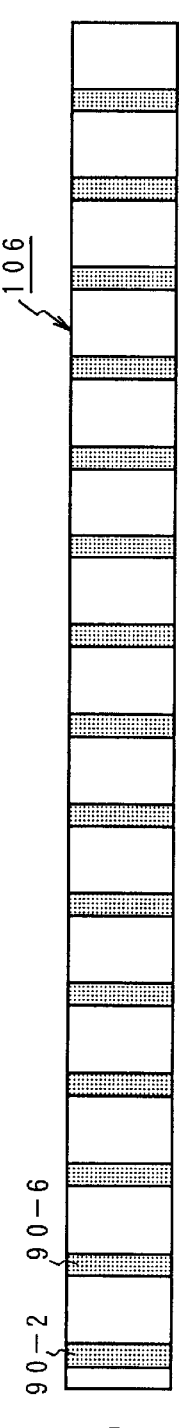
Figure 12E:
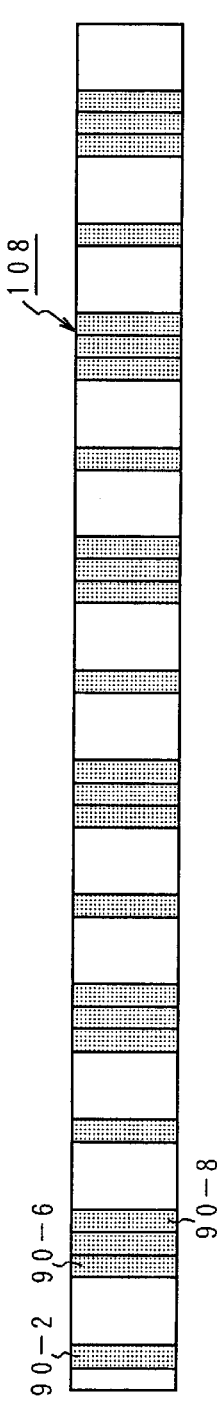

FIGS. 12A to 12E are explanatory diagrams of the second servo pattern 90 which is written between the first servo patterns 88 sequel to the data area 86 in the landing area 84 in FIG. 4. The second servo pattern 90 in FIG. 12A is the same as that in FIG. 5B. The. (n) second servo patterns 90-1 to 90-n are completely filled and written in the interval between the sectors serving as an interval between the first servo patterns 88 written subsequently to the data area. Therefore, the second servo patterns are written over the whole circumference of the landing area 84. In a second servo pattern arrangement 102 in FIG. 12B, the second servo patterns 90-2, 90-4, . . . are alternately written between the sectors between the first servo patterns as compared with FIG. 12A. In a second servo pattern arrangement 104 in FIG. 12C, the second servo patterns 90-2, 90-5, . . . are written in every third place between the sectors. Further, in a second servo pattern arrangement 106 in FIG. 12D, the second servo patterns 90-2, 90-6, . . . are written in every fourth place between the sectors. In FIG. 12E, after the second servo pattern 90-2 was written between the sectors, the next three second servo patterns 90-6 to 90-8 are recorded while three spaces are held between the pattern 90-2 and pattern 90-6. After that, the writing of one second servo pattern and three second servo patterns is similarly repeated while three spaces are held. As shown in the examples of FIGS. 12A to 12E, as for the second servo patterns 90 to be written between the first servo patterns 88 sequel to the landing area 86 in the landing area 84 in the invention, it is sufficient that they are written in an interval narrower than that of the first servo patterns 88. The second servo patterns can be recorded so as to fill the whole circumference or can be also written with a space. A proper writing arrangement of the second servo patterns can be used as necessary. In the embodiment, the first servo pattern 88 sequel to the data area 86 is written in the landing area 84 and the second servo patterns 90 are written between the first servo patterns 88. However, it is also possible to write only the second servo patterns 90 with regard to the landing area 84 without writing the first servo pattern 88.

Figure 13A:
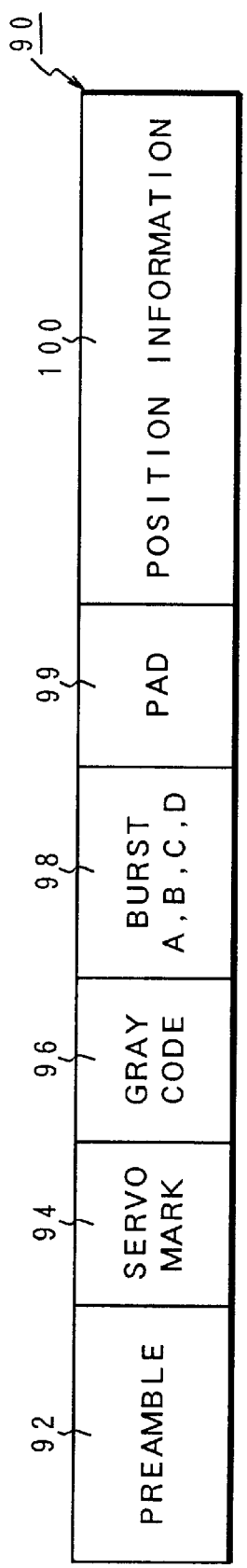
FIGS. 13A and 13B are explanatory diagrams of formats of servo patterns to be written in the landing area in the invention.
Figure 13B:
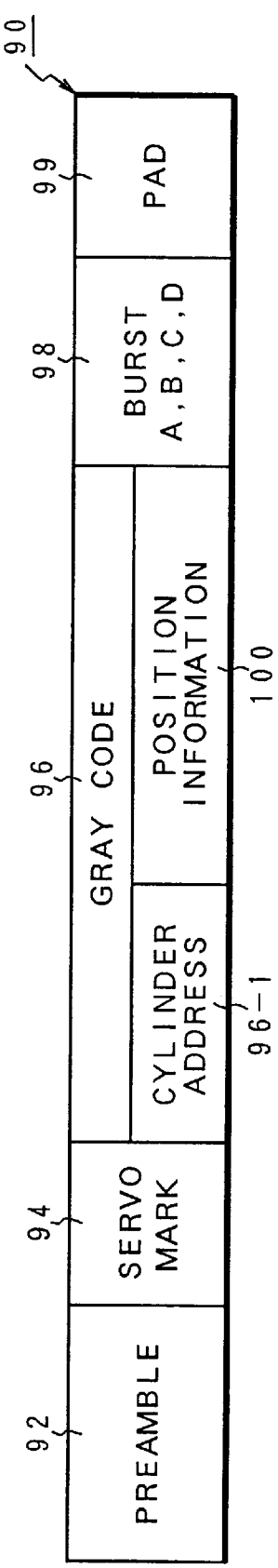

FIGS. 13A and 13B show servo formats of the second servo patterns which are written in the landing area of the invention. The second servo pattern 90 in FIG. 13A has the same servo format as that of FIG. 5C. The preamble 92, servo mark 94, gray code 96, burst 98, and pad 99 have the same servo format as that of the first servo pattern 88 from the data area 86. The position information 100 showing the position in the circumferential direction between the sectors is written after them. FIG. 13B shows another servo format of the second servo pattern 90. In this servo format, the area of the gray code 96 is divided into an area of a cylinder address 96-1 of the first servo pattern 88 and an area of the position information 100 showing the position in the circumferential direction between the sectors which is peculiar to second servo pattern 90, and they are written by gray codes. The burst 98 and pad 99 are written after the gray code 96. Since the position information 100 peculiar to the second servo pattern 90 is written by the same gray code as that of the cylinder address 96-1, the servo writing operation is simplified by collectively writing it into the area of the same gray code.

Figure 14A:
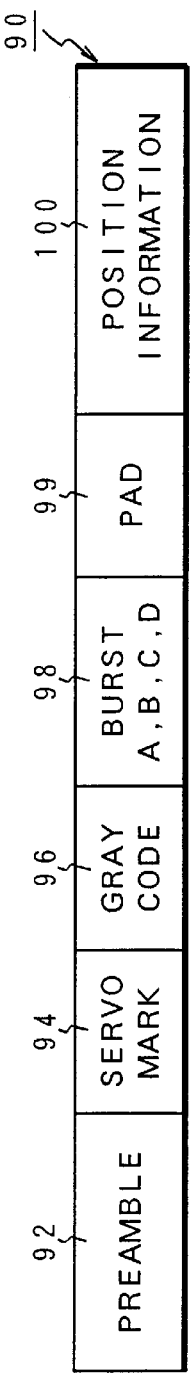
FIGS. 14A to 14E are explanatory diagrams of formats of servo patterns which are different from those in a data area and are written in the landing area in the invention.
Figure 14B:
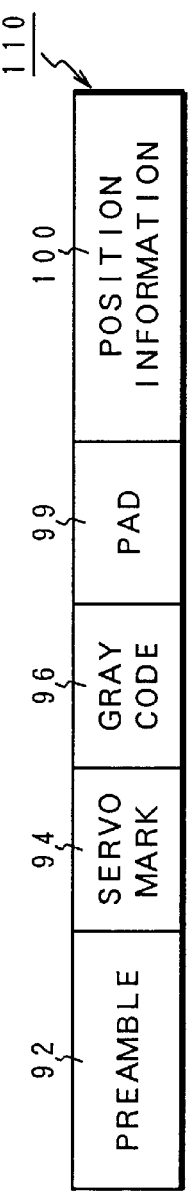
Figure 14C:
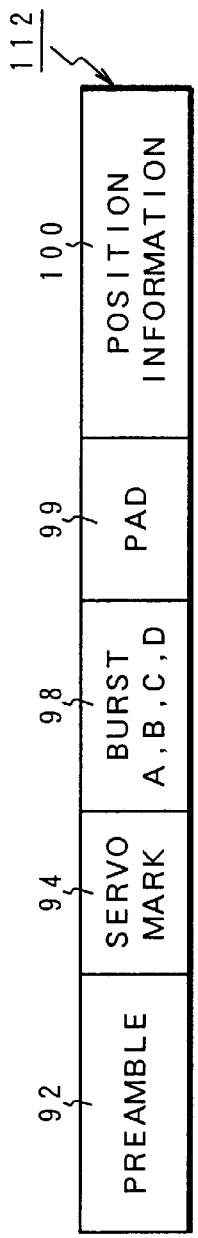
Figure 14D:
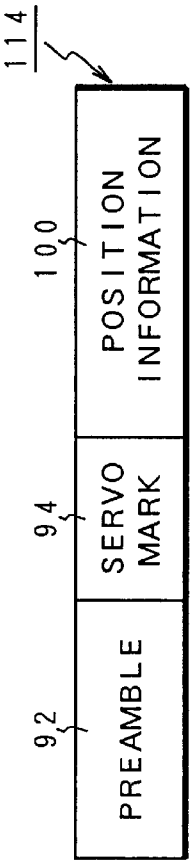
Figure 14E:
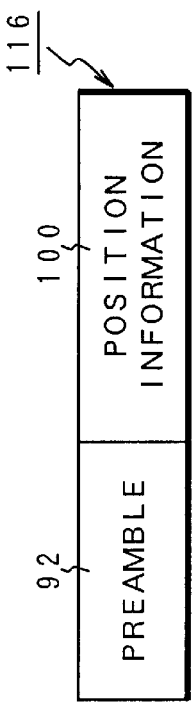

FIGS. 14A to 14E show servo formats of the second servo patterns which are written in the landing area according to the invention and are characterized in that the servo formats are different from the servo format of the servo pattern in the data area. The second servo pattern 90 in FIG. 14A is the same as that of FIG. 5C and has the same servo format as that of the first servo pattern 88. That is, it has the servo format comprising the preamble 92, servo mark 94, gray code 96, burst 98, and pad 99, and the position information 100 showing the position in the circumferential direction between the sectors which is peculiar to the second servo pattern 90 is written after them. On the other hand, a second servo pattern 110 in FIG. 14B is constructed by the preamble 92, servo mark 94, gray code 96, pad 99, and position information 100, and the burst 98 in the servo pattern 90 in FIG. 14A is omitted. A second servo pattern 112 in FIG. 14C is constructed by the preamble 92, servo mark 94, burst 98, pad 99, and position information 100, and the gray code 96 in FIG. 14A is omitted. A second servo pattern 114 in FIG. 14D is constructed by the preamble 92, servo mark 94, and position information 100, and the gray code 96, burst 98, and pad 99 in FIG. 14A are omitted. Further, a second servo pattern 116 in FIG. 14E is constructed by only the preamble 92 and position information 100. In any of the second servo patterns 90, 110, 112, 114, and 116, by providing the preamble 92 to the head of the servo pattern and providing the position information 100 in the circumferential direction showing the position between the sectors, it is possible to realize the change to the servo interruption timing synchronized with the first servo pattern in the data area at a time point of the completion of the servo lead-in by an arbitrary second servo pattern. As position information 100 of the second servo pattern, although the position information showing the position in the circumferential direction between the sectors between the first servo patterns sequel to the data area is written, it is also possible to write position information showing the position in the circumferential direction in which an index servo pattern on which index information showing a rotation reference position of the disk has been written is used as a reference.

As mentioned above, according to the invention, the servo information is written in the landing area on the disk medium at a finer interval than that of the data area and, when the head is moved to the landing area on the disk medium by the ramp loading operation, the servo lead-in operation is performed by using the servo information written in the landing area at the fine interval, and the servo patterns are recorded at a short interval. Therefore, the servo lead-in operations of the number as many as the number of servo sampling times necessary for the servo lead-in can be performed in a short time, and the time for the servo lead-in operation necessary for adjustments of the proper values in the AGC and PLL can be remarkably reduced. When the head is moved to the landing area, even if the head is come into contact with the medium and the servo information is consequently missing, since the servo information has been written in the circumferential direction of the landing area, for example, over the whole circumference, even if the missing of the servo information due to the contact of the head with the medium occurs, the servo information is obtained at a short sampling interval. Therefore, no trouble is caused in the servo lead-in operation and the servo lead-in can be completed in a short time.

The invention is not limited to the foregoing embodiment but incorporates many modifications and variations without losing the objects and advantages of the invention. The invention is not limited by the numerical values shown in the embodiment.

What is claimed is:

1. A disk apparatus having a ramp loading mechanism, comprising:

a disk medium in which a first servo information has been written in a data area on the medium and a second servo information in addition to said first servo information has been written as servo information in a landing area; and a lead-in processing unit which performs a servo lead-in on the basis of said second servo information when a head is moved from a ramp to said landing area on said medium.

2. An apparatus according to claim 1, wherein on said disk medium, said second servo information has been written in said landing area at a finer interval than that of said first servo information written in said data area.

3. An apparatus according to claim 1, wherein on said disk medium, said second servo information has been written in said landing area at a finer interval in addition to same first servo information written in a data area.

4. An apparatus according to claim 1, wherein on said disk medium, said servo information has been written in said landing area over a whole circumference.

5. An apparatus according to claim 1, wherein on said disk medium, as said servo information in said landing area, second servo information having a servo pattern to which position information which can discriminate a position in the circumferential direction was added has been written on a same servo pattern as that of first servo information in said data area.

6. An apparatus according to claim 1, wherein on said disk medium, as said servo information in said landing area, second servo information having a servo pattern to which position information which can discriminate a position in the circumferential direction was added has been written on a gray code of a same servo pattern as that of first servo information in said data area.

7. An apparatus according to claim 5, wherein the position in the circumferential direction between sectors by said first servo information has been written as said position information of said second servo information.

8. An apparatus according to claim 5, wherein the position in the circumferential direction from index servo information on the medium has been written as said position information of said second servo information.

9. An apparatus according to claim 5, wherein upon completion of a lead-in based on said second servo information, said lead-in processing unit obtains a deviation time for said first servo information on the basis of said position information of said second servo information and changes a subsequent servo interruption timing by said deviation time, thereby synchronizing said timing with the first servo information.

10. An apparatus according to claim 1, wherein on said disk medium, as said servo information in said landing area, second servo information having a servo pattern to which position information which can discriminate a position in the circumferential direction was added has been written on a servo pattern different from that of first servo information in a data area.

11. An apparatus according to claim 10, wherein as said servo pattern of said second servo information different from that of said first servo information, a servo pattern obtained by excluding burst information from said first servo information is used.

12. An apparatus according to claim 10, wherein as said servo pattern of said second servo information different from that of said first servo information, a servo pattern obtained by excluding cylinder information from said first servo information is used.

13. An apparatus according to claim 10, wherein as said servo pattern of said second servo information different from that of said first servo information, a servo pattern comprising a preamble and servo mark information is used.

14. An apparatus according to claim 10, wherein as said servo pattern of said second servo information different from that of said first servo information, a servo pattern comprising only a preamble is used.

15. A disk medium which is used for a disk apparatus having a ramp loading mechanism, wherein a first servo information has been written in a data area on the medium and a second servo information in addition to said first servo information has been written as servo information in a landing area.

16. A medium according to claim 15, wherein second servo information has been written in said landing area at a finer interval in addition to first servo information written in a data area.

17. A medium according to claim 15, wherein second servo information has been written in said landing area at a finer interval in addition to same first servo information as that in a data area.

18. A medium according to claim 15, wherein said servo information has been written in said landing area over a whole circumference.

19. A medium according to claim 15, wherein as said servo information in said landing area, second servo information having a servo pattern to which position information which can discriminate a position in the circumferential direction was added has been written in first servo information in said data area.

20. A medium according to claim 15, wherein as said servo information in said landing area, second servo information having a servo pattern to which position information which can discriminate a position in the circumferential direction was added has been written in a servo pattern different from that of first servo information in said data area.

* * * * *